United States Patent Office 3,654,338
Patented Apr. 4, 1972

3,654,338
HALOFORMIC ACID ESTER ISOCYANATES
Heinrich Krimm, Krefeld-Bockum, and Hermann Schnell, Krefeld-Urdingen, Germany, assignors to Farbenfabriken Bayer Aktiengesellschaft, Leverkusen, Germany
No Drawing. Continuation-in-part of application Ser. No. 531,020, Mar. 2, 1966. This application Mar. 20, 1969, Ser. No. 809,010
Claims priority, application Germany, Mar. 3, 1965, F 45,411
Int. Cl. C07c 119/04; C08g 22/04
U.S. Cl. 260—463                    7 Claims

ABSTRACT OF THE DISCLOSURE

Haloformic acid ester isocyanates are prepared by reacting a primary amino alcohol with phosgene.

---

This application is a continuation-in-part of our copending application Ser. No. 531,020 filed Mar. 2, 1966, now abandoned.

This invention relates to haloformic acid ester isocyanates, particularly to chloroformic acid ester isocyanates and to a process for preparing the same. More specifically, this invention relates to organic compounds which contain a haloformic acid ester group and an isocyanate group in the same molecule.

It has heretofore been known that the rate of reaction of a primary amino group with phosgene is different than the rate of reaction of a hydroxyl group with phosgene. Whereas primary amines react violently with phosgene, the reaction of phosgene with hydroxyl groups is relatively mild. Since the rate of the reaction of a primary amino group with phosgene is substantially greater than the rate of reaction of phosgene with a hydroxyl group it was to be expected that the reaction of an amino alcohol compound with phosgene would result in the amino group first reacting with phosgene to produce an isocyanato group which isocyanato group would then react in a second step with the hydroxyl group of the amino alcohol and thereby yield higher molecular weight and crosslinking products. However, contrary to all expectations, it has been found that well defined products of haloformic acid ester isocyanates are formed from the reaction of amino alcohols and phosgene under the reaction conditions of this invention.

The haloformic acid ester isocyanates of this invention may be represented by the following general formula

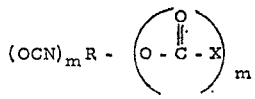

wherein R represents substituted or unsubstituted aliphatic, cycloaliphatic and aromatic group; X represents a halogen group and $m$ is an integer of from 1 to 3. Preferably R represents a substituted or unsubstituted aliphatic, cycloaliphatic and aromatic hydrocarbon radical having from 2 to 18 carbon atoms, X is a chlorine group and $m$ is preferably an integer of from 1 to 2, the sum of the two $m$'s being an integer of up to 3. Most preferably R represents a substituted or unsubstituted alkylene, alkenylene, cycloalkylene or arylene radical having from 2 to 18 carbon atoms, X is a chlorine group and $m$ is 1 in each instance. Among the preferred compounds represented by the aforesaid formula are those wherein R is a divalent hydrocarbon radical selected from the group consisting of alkylene, alkenylene, alkynylene, arylene, arylene-alkylene, alkylenearylene, arylenealkenyl-ene, arylenealkynylene, alkynylenearylene, cycoalkylene, cycloalkenylene, alkylcycloalkylene, alkylcycloalkenylene, cycloalkylenealkylene and cycloalkenylenealkylene having from 2 to 18 carbon atoms. The compounds of this invention, as illustrated in the above general formula, will contain at least one isocyanate group and a haloformate group. Again, when R is substituted, the substituent should be substantially non-reactive with NCO and/or

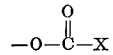

groups. These radicals represented by R above may possess other substituents, such as, for example, alkyl, halogen, nitro, alkoxy, carboalkoxy and the like. As examples of radicals represented by R above, there may be mentioned ethylene, butylene, pentylene, hexylene, octylene, dodecylene, hexadecylene, octadecylene, phenylene, naphthylene, anthrylene, biphenylylene, 2,7-phenanthrylene, 1-propenylene, 2-propenylene, 1-butenylene, 1-pentenylene, 1-hexenylene, octenylene, dodecenylene, hexadecenylene, octadecenylene and the like; 1,3-cyclopentylene, 1,4-cyclohexylene and the like; phenylenedimethylene, phenylenediethylene, phenylenedibutylene, phenylenedihexylene, phenylethylene, phenylpropylene and the like. Additionally, R may be any of the radicals set forth hereinafter in describing the amino alcohols from which the haloformic acid ester isocyanates are prepared.

By the term "substituted" as used throughout the specification, we mean to include those compounds wherein the aforementioned R groups can be aliphatic with alicyclic or aromatic substituents; alicyclic with aliphatic or aromatic substituents; or aromatic with aliphatic or alicyclic substituents in addition to other groups hereinabove indicated.

The compounds of this invention are polyfunctional, in that each compound contains at least two reactive groups in the molecule. Due to the presence of the isocyanate group, these compounds are very reactive and readily condense with active hydrogen containing compounds such as alcohols, amines, carboxylic acids, amides and water to form the corresponding carbamates, ureas and the like. Also the isocyanates can be polymerized to form dimeric, trimeric and polymeric substances, or copolymerized to form valuable polymeric products such as coatings and lacquers according to procedures known to those skilled in the art such as, for example, according to the methods disclosed in U.S. Pats. Nos. 2,671,082; 2,683,144; 2,978,449 and 2,252,942 as well as the procedure of British Pat. No. 856,372. In addition, the presence of the haloformic acid ester group provides a reactive acid halide group which is capable of condensation with compositions of matter which contain active hydrogen atoms according to procedures known to those skilled in the art. Thus they may react with primary or secondary amines to form urethanes, with compounds which contain hydroxyl groups to form diesters of carbonic acid, and with other similar types of organic compositions which contain active hydrogen atoms.

It is, therefore, an object of the present invention to provide novel compounds which are polyfunctional in nature. Another object of the present invention is to provide novel compounds having isocyanate and halo-formic acid ester groupings in the same molecule. Another object of the present invention is to provide polyfunctional compounds which are suitable as intermediates in the plastic and resin field. A further object of the present invention is to provide a novel process for preparing polyfunctional compounds. A still further object of the present invention is to provide a novel process for preparing polyfunctional compounds free of polycondensation products.

The foregoing objects and others which will become apparent from the following description are accomplished in accordance with this invention, generally speaking, by providing novel poly-functional compositions, that is, compositions containing isocyanate and haloformate groups as indicated above.

These compositions are prepared by reacting in a single stage reaction a primary amino alcohol of the formula $$(NH_2)_m—R—(OH)_m$$

wherein R and $m$ are the same as defined above with an excess of a carbonyl dihalide in the presence of tertiary amine catalysts.

By the process of this invention the appropriate amino alcohol having one to three, but preferably one, amino group and one to three, but preferably one, hydroxyl group is reacted with a carbonyl dihalide, preferably phosgene, thereby producing the desired compound containing both an isocyanate and haloformate group.

As distinct from the previous preparations, the carbonyl halide combines directly with the hydroxyl group without first having to form a sodium salt thereof, nor is a solvent or acid acceptor required.

As examples of suitable starting materials for the novel compositions of this invention there may be mentioned amino alcohols represented by the formula:

$$(NH_2)_m—R_1—(OH)_m$$

wherein $R_1$ is a substituted or unsubstituted aliphatic radical having from 2 to 18 carbon atoms and $m$ is 1 to 3. Illustrative starting compounds include the following primary amino alcohols:

2-aminoethyl alcohol,
3-aminopropyl alcohol,
4-aminobutyl alcohol,
5-aminopentyl alcohol,
7-aminoheptyl alcohol,
8-aminooctyl alcohol,
9-aminononyl alcohol,
10-aminodecyl alcohol,
2-methyl-3-aminopropyl alcohol,
2,2-dimethyl-3-aminopropyl alcohol,
3-ethyl-5-aminopentyl alcohol,
3,4-diethyl-5-aminopentyl alcohol,
4,4-dimethyl-6-aminohexyl alcohol,
2-methyl-4-ethyl-6-aminohexyl alcohol,
9-aminononyl alcohol,
5,6,7-triethyl-9-aminononyl alcohol,
4-amino-2-butenyl alcohol,
5-amino-3-pentenyl alcohol,
7-amino-4-heptenyl alcohol,
8-amino-4-octenyl alcohol,
9-amino-5-nonenyl alcohol,
10-amino-6-decenyl alcohol,
3-ethyl-5-amino-3-pentenyl alcohol,
3,4-dimethyl-5-amino-3-pentenyl alcohol,
2-methyl-4-ethyl-6-amino-3-hexenyl alcohol,
5,6,7-triethyl-9-amino-7-nonenyl alcohol,
2-phenyl-3-aminopropyl alcohol,
3-naphthyl-5-aminopentyl alcohol,
3-styryl-5-aminopentyl alcohol,
4-tolyl-6-aminohexyl alcohol,
6-cumenyl-7-aminoheptyl alcohol,
5-xylyl-8-aminooctyl alcohol,
7-mesityl-9-aminononyl alcohol,
2-cyclohexyl-3-aminopropyl alcohol,
3-cyclohexyl-5-aminopentyl alcohol,
4-cyclohexyl-6-aminohexyl alcohol,
5-cyclohexylmethyl-7-aminoheptyl alcohol,
3-cycloheptyl-5-aminopentyl alcohol,
3-cyclohexenyl-5-aminopentyl alcohol,
5-cycloheptenyl-methyl-8-aminooctyl alcohol,
and the like.

Other hydroxy amines which can be used for the preparation of the novel compositions of this invention can be represented by the following formula:

$$(NH_2)_m—R_2—(OH)_m$$

wherein $R_2$ is a substituted or unsubstituted cycloaliphatic radical having from 4 to 18 carbon atoms and $m$ is 1 to 3. Illustrative starting materials including the following:

2-aminocyclobutyl alcohol,
3-aminocyclopentyl alcohol,
4-aminocyclohexyl alcohol,
5-aminocycloheptyl alcohol,
6-aminocyclooctyl alcohol,
3-amino-4-cyclopentenyl alcohol,
4-amino-5-cyclohexenyl alcohol,
2-aminocyclobutyl-methyl alcohol,
2-amino-3-ethylcyclobutyl alcohol,
3-aminoethyl-2-cyclobutyl alcohol,
3-aminocyclopentylmethyl alcohol,
3-amino-2-ethylcyclopentyl alcohol,
2-aminoethyl-3-cyclopentyl alcohol,
5-aminocycloheptylmethyl alcohol,
3-amino-5-methylcyclohexyl alcohol,
3-amino-5,6-dimethylcyclohexyl alcohol,
3-amino-4-ethylcyclopentyl alcohol,
3-amino-4,5-diethylcyclopentyl alcohol,
4-amino-5-methyl-2-cyclohexenyl alcohol,
and the like.

Still other hydroxy amines which can be used for the preparation of the novel compositions of this invention can be represented by the following formula:

$$(NH_2)_m—R_3—(OH)_m$$

wherein $R_3$ is a substituted or unsubstituted aromatic radical having from 6 to 18 carbon atoms and $m$ is 1 to 3. Typical starting compounds within this formula include the following:

4-aminophenol,
2-aminophenol,
3-aminophenol,
7-amino-2-naphthol,
7-amino-1-naphthol,
4'-amino-4-biphenylol,
5-amino-2-indenol,
4-aminobenzyl alcohol,
4-aminophenylethyl alcohol,
7-amino-2-naphthylmethyl alcohol,
3-aminopropyl-4-phenol,
4-aminomethylphenol,
2(3'-aminopropyl)naphthol,
4-amino-2-methylphenol,
6-amino-2,4-xylol,
4-amino-3-cumenol,
4-amino-2-methoxyphenol,
4-aminostyryl alcohol,
4(3'-amino-1-propenyl)phenol,
and the like.

Among the more preferred suitable primary amino alcohols which may be used in the preparation of the polyfunctional compounds of this invention are the following substituted and unsubstituted aliphatic, araliphatic, or aromatic amino alcohols:

amino ethanol,
3-amino propanol,
2-amino butanol,
2-amino-2-methyl propanol,
4-amino benzyl alcohol,
4-amino phenylethyl alcohol and
2,2-(4-amino-4'-hydroxyethoxydiphenyl)-propane, and amino phenols such as o-, m- and p-amino phenol,
3-amino-o-cresol,
4-amino-o-cresol,
5-amino-o-cresol,
4-amino-m-cresol,
6-amino-m-cresol,
2-amino-p-cresol, 3-amino-p-cresol,
2-chloro-4-amino phenol,
5-chloro-2-amino phenol,
2-amino-1-naphthol,
4-amino-1-naphthol,
5-amino-1-naphthol,
6-amino-1-naphthol,
8-amino-1-naphthol,
1-amino-2-naphthol,
3-amino-2-naphthol,
5-amino-2-naphthol,
7-amino-2-naphthol,
8-amino-2-naphthol,
4-amino-4'-hydroxydiphenyl,
4-amino-4'-hydroxydiphenyl methane,
4-amino-3'-hydroxydiphenyl methane,
2,2-(4-amino-4'-hydroxylidphenyl)-propane,
2,2-(4-amino-4'-hydroxy-2-methyl-diphenyl)-propane,
2,2-(4-amino-4'-hydroxy-3-methyl-diphenyl)-propane,
2,2-(4-amino-4'-hydroxy-3-chlorodiphenyl)-propane,
2,2-(4-amino-4'-hydroxy-3,5-dimethyldiphenyl)-propane,
2,2-(4-amino-4'-hydroxy-3,5)-dichlorodiphenyl)-propane,
2,2-(2-amino-4'-hydroxy-5-methyl-diphenyl)-propane,
2,2-(4-amino-2'-hydroxydiphenyl)-propane,
2,2-((4-amino-2',4'-dihydroxydiphenyl)-propane,
2,2-(2,4-diamino-4'-hydroxydiphenyl)propane,
2,2-(4-amino-4'-hydroxydiphenyl)-butane,
1,1-(4-amino-4'-hydroxydiphenyl)-cyclohexane,
1,1,1-(4-amino-4'-hydroxytriphenyl)-ethane and
3-(4'-aminophenyl)-5-hydroxy-1,1,3-trimethylindane and the like.

The catalytic agents suitable for the process of this invention are the tertiary amines such as, for example, trimethylamine, triethylamine, tributylamine, N,N-dimethyl cyclohexyl amine, N,N-dimethyl benzylamine, pyridine, quinoline and the like, and in particular, N,N-dimethyl aniline and N,N-diethyl aniline.

Although a solvent is not required, it is preferred that the reaction be carried out in the presence of an inert solvent such as, for example, hydrocarbons such as benzene, toluene and xylene, chlorinated hydrocarbons such as methylene chloride, chloroform, carbon tetrachloride, ethylene chloride, chlorobenzene, dichlorobenzene, chlorotoluene, dichlorotoluene, trichlorotoluene and chloronaphthalenes and esters such as ethyl acetate, propyl acetate and butyl acetate and the like.

One particularly suitable embodiment of the process of this invention comprises dissolving carbonyl dihalide in an inert medium such as, for example, toluene, xylene, tetrahydronaphthalene, benzene, chlorinated aromatic solvents and hydrogenated aromatic hydrocarbons and the like and then adding a solution or suspension of a primary amino alcohol in a second quantity of the same medium dropwise. A tertiary amine is added to the reaction mixture along with the amino alcohol at the same rate as it is being used up in the reaction. The temperature of the reaction mixture during the addition of the primary hydroxyl amine is maintained in the range of from about −10° C. to about 50° C., preferably from about −10° C. to about 30° C. After the addition is complete, the temperature of the reaction mixture is elevated to about the reflux temperature of the inert medium, generally not much above about 150° C. The excess carbonyl dihalide is removed under vacuum, and the tertiary amine hydrohalide is removed by washing with ice water. The reaction product is then separated from the solution by any suitable conventional purification techniques such as distillation, crystallization and the like.

In an alternative procedure, the solution or suspension of the primary amino alcohol is passed into the carbonyl dihalide solution at the reaction temperature together with the tertiary amine.

Generally, it is necessary to heat the reaction mixture to a temperature of about 150° C. or higher in order to complete the reaction. On completion of the reaction, the hydrohalide of the tertiary base, which is formed as a secondary product, is removed by successive washings with ice water. The reaction product is recovered from the solution by first concentrating the solution by evaporation or the like, followed by recrystallization or distillation.

In order to avoid condensation reactions, it is necessary to use an excess of carbonyl dihalide. In cases where the tertiary base is added dropwise, a small excess, in the region of from 5 to 50 percent, that is, 1.05 to 1.5 mols of carbonyl dihalide per hydroxyl or amino group, is generally sufficient.

Generally, exactly two mols of tertiary amine per amino group and one mol of teritary amine per hydroxyl group are used. If an excess of tertiary amine is used, it will give rise to a number of secondary reactions with excess carbonyl dihalide, particularly at elevated temperatures and will result in the formation of alkyl halides from aliphatic tertiary amines or nuclear acylation. In addition, an excess of tertiary amines may even give rise to the formation of dyes, especially in cases where aromatic tertiary amines are used.

Although reaction temperatures up to about 150° C. have been found desirable, temperatures below and above this range can be utilized. The particular temperature employed will be dependent in part upon the particular amino alcohol and solvent used. The optimum temperature at the beginning of the reaction may be in the range of from about −10° C. to about 30° C. After the tertiary amine has been added, the temperature may be increased to the point at which the solvent begins to reflux, but generally not beyond about 150° C.

Pressure is in no wise critical and the instant process can be conducted at atmospheric, subatmospheric and superatmospheric pressures.

The reaction products are generally well-defined compounds having definite boiling points and, where crystalline, definite melting points. Surprisingly, these compounds are readily obtained in a substantially pure form, so that, in most cases, they can be recovered by the conventional distillation techniques free of decomposition products.

Inasmuch as the novel compositions of this invention are polyfunctional, in that each compound contains at least one isocyanate group and a haloformate group in the molecule, they are of particular interest in the field of application wherein isocyanates and haloformates have been previously used. Also these compounds are useful intermediates in the preparation of numerous types of organic compounds. As it is known in the art that isocyanates react with alcoholic OH— groups very easily and without catalysts (compare Houben-Weyl, 4th ed., vol. 8, page 131) and as it is also known in the art that alcoholic OH— groups react very easily with phosgene and chloroformic acid ester groups also without catalysts (compare Houben-Weyl, 4th ed., vol. 8, page 106) and as it is furthermore known in the art that phenolic OH— groups react with isocyanates as well with chloroformic acid ester groups (compare Houben-Weyl, 4th ed., vol. 8, pages 104 and 131) and as it is still furthermore known in the art that primary and secondary amines react with isocyanates as well with chloroformic acid ester groups (compare Houben-Weyl, 4th ed., vol. 8, pages 132, 138 and 139), the compositions of this invention may be utilized as chemical intermediates in reactions with active hydrogen compounds such as hydroxyl polyesters, hydroxyl polyethers, hydroxyl polyesteramides, polyacetals, amines, aminoalcohols and the like in the formation of polyurethane plastics in the form of foams, elastomers, coatings, adhesives and the like according to recognized procedures known to those skilled in the art, such as, for example, those methods disclosed in U.S. Pats. Nos. 2,729,618; 2,948,691; 2,981,719; 3,143,517; 3,236,787 and Reissue 24,514.

In order to more fully and clearly illustrate the present invention the following specific examples are presented. It is intended that the examples be considered as illustrative rather than limiting on the invention disclosed. In the examples, all parts are by weight unless otherwise specified.

EXAMPLE 1

Approximately 250 parts of phosgene are introduced into about 2000 parts by volume of chlorobenzene at 5° C. to form a solution into which about 227 parts of 2,2-(4-amino-4′-hydroxydiphenyl)-propane are introduced. A solution of about 363 parts of dimethyl aniline in about 500 parts by volume of chlorobenzene is added dropwise to this solution at about 20° C. over a period of about two hours. The resulting solution is heated to about 100° C. over a period of about two hours and is kept at this temperature for about 30 minutes. It is then allowed to cool, after which the reaction vessel is exhausted to a pressure of about 20 mm. Hg in order to remove any excess phosgene. After cooling to about 0° C. the dimethyl aniline hydrochloride is removed by shaking the solution three times with ice water. The product is then dried over sodium sulphate, after which the solvent is removed. The isopropylidene-4-isocyanatophenyl - phenyl - 4′ - chloroformic acid ester distills at a temperature of between about 154 and 160° C./0.08 mm. Hg in the form of a colorless liquid which solidifies in crystalline form. Yield: 281 parts (89% of theoretical), M.P. 55–56° C. (from cyclohexane).

$C_{17}H_{14}O_3NCl$ (mol wt. 315.7).—Calculated (percent): C, 64.5; H, 4.44; N, 4.44. Found (percent): C, 64.34; H, 4.28; N, 4.61.

5 parts by weight of this isocyanato chloroformic acid ester and 6 parts by weight of a polyester with an OH— number of 300, obtained from 1 mol adipic acid, 1 mol phthalic acid anhydride and 2 mol trimethylol propane are dissolved in methylene chloride and the solution is poured on a sheet. After about 2 hours the obtained film is tacky-free and after further 24 hours the film is hard and highly elastic and glossy.

EXAMPLE 2

Approximately 250 parts of phosgene are introduced into about 1500 parts by volume of chlorobenzene to form a solution into which about 109 parts of p-amino phenol are introduced. A solution of about 363 parts of dimethyl aniline in about 300 parts by volume of chlorobenzene is then added dropwise to this solution at about 20° C. over a period of about three hours. The resulting solution is slowly heated to a temperature of about 100° C. and maintained at this temperature for about 15 minutes. Any excess phosgene is removed at about 50° C./20 mm. Hg. After cooling to about 0° C., the dimethyl aniline hydrochloride is removed by shaking the solution twice with ice water, and the resulting product is dried over sodium sulphate. The solvent is removed at 20 mm. Hg and the 4-isocyanatophenylchloroformic acid ester is distilled at a temperature of between about 120 and 125° C./10 mm. Hg. Yield 162 parts (82% of theoretical), M.P.: 40° C.

$C_8H_4O_3NCl$ (mol wt. 197.5).—Calculated (percent): C, 48.7; H, 2.04; N, 7.09. Found (percent): C, 48.61; H, 2.11; N, 6.98.

EXAMPLE 3

Approximately 350 parts of phosgene are introduced into 2000 parts by volume of chlorobenzene at about 5° C. to form a solution in which 255 parts of 2,2-(4-amino-4′-hydroxy-3,5-dimethyl-diphenyl)-propane are suspended. A solution containing about 363 parts of dimethyl aniline in about the same quantity of chlorobenzene is added dropwise while cooling to the resulting suspension at a temperature of about 20° C. over a period of about 30 minutes. The mixture is heated for about 30 minutes until the solvent boils, cooled to about 0° C., washed twice with ice water and then dried over sodium sulphate. After the solvent has been removed at about 20 mm. Hg the isopropylidene-3,5-dimethyl-4-isocyanatophenyl - phenyl - 4′-chloroformic acid ester is distilled off at a temperature of about 176° C./0.1 mm. Hg in the form of a colorless, viscous liquid. Yield: 306 parts (89% of the theoretical).

$C_{19}H_{18}O_3NCl$ (mol wt. 343.7).—Calculated (percent): C, 66.6; H, 5.25; N, 4.08. Found (percent): C, 66.41; H, 5.32; N, 4.09.

EXAMPLE 4

Approximately 250 parts of phosgene are introduced into 1600 parts by volume of chlorobenzene to form a solution in which 241 parts of 2,2-(2-amino-4′-hydroxy-5-methyl-diphenyl)-propane is suspended. A solution of about 363 parts of dimethyl aniline in an equivalent amount of chlorobenzene is added dropwise over a period of about one hour at about 20° C. while cooling with ice water. The temperature is raised to about 100° C. over a period of about 30 minutes. The mixture is maintained at this temperature for approximately 15 minutes and is then cooled to about 0° C. It is washed twice with ice water and then dried over sodium sulphate. The solvent is removed at aout 20 mm. Hg. The isopropylidene-5-methyl - 2 - isocyanatophenyl-phenyl - 4′ - chloroformic acid ester is distilled over at about 145 to about 147° C./0.05 mm. Hg in the form of a colorless liquid. Yield: 290 parts (88% of the theoretical).

$C_{18}H_{16}O_3NCl$ (mol wt. 329.7).—Calculated (percent): C, 65.7; H, 4.86; N, 4.25. Found (percent): C, 65.38; H, 4.66; N, 4.20.

EXAMPLE 5

Approximately 250 parts of phosgene are introduced into 2000 parts by volume of chlorobenzene to form a solution in which 256 parts of 2,2 - (2,4 - diamino - 4′-hydroxy - 5 - methyl - diphenyl) - propane are suspended. A solution of about 459 parts of N-methyldecahydroquinoline is added dropwise while cooling at about 20° C. over a period of about 30 minutes. The temperature is then increased to about 100° C. over a period of about 20 minutes. The mixture is kept at this temperature for about one hour and is then cooled to about 0° C. The N-methyldecahydroquinoline hydrochloride is extracted from the mixture by washing with ice water. The product is then dried over sodium sulphate, and the solvent is distilled off at about 20 mm. Hg. The residue which solidifies in crystalline form is recrystallized from cyclohexane. M.P. 102–103° C., yield: 300 parts (81% of the theoretical), B.P. 200–204° C./0.4 mm. Hg. Isopropylidene - 5 - methyl - 2,4 - diisocyanatophenyl - phenyl - 4′-chloroformic acid ester:

$C_{19}H_{15}O_4N_2Cl$ (mol wt. 371.2).—Calculated (percent): C, 61.4; H, 4.04; N, 7.55. Found (percent): C, 61.27; H, 4.10; N, 7.48.

A solution of 2 parts by weight of this diisocyanato chloroformic acid ester and 3 parts by weight of a polyether with an OH— number of 320, obtained from 1 mol trimethylolpropane and 9 mol propylene oxide in dioxane is poured on a sheet. After 24 hours a hard and elastic coating is obtained.

EXAMPLE 6

100 parts of phosgene are introduced into about 500 parts by volume of methylene chloride to form a solution in which about 57 parts of 2,2 - (4 - amino - 4′ - hydroxy-diphenyl)-propane are suspended. A solution of about 127 parts of dimethylcyclohexylamine in about 100 parts by volume of methylene chloride is added dropwise at about 10° C. over a period of about 1.5 hours. The reaction mixture is stirred for about two hours at room temperature, after which time any excess phosgene is removed along with a portion of the solvent under a vacuum of about 100 mm. Hg and then cooled to 0° C. After being washed twice with ice water, the mixture is dried over sodium sulphate and the solvent removed by evaporation. The residue is distilled at a temperature of from about 190 to about 198° C./2 mm. Hg. Yield: 64.5 parts (82.0% of theoretical) of isopropylidene-4-isocyanatophenyl-phenyl-4'-chloroformic acid ester.

EXAMPLE 7

Approximately 216 parts of phosgene are introduced into 1600 parts by volume of chlorobenzene at 0° C. to form a solution into which 267 parts of 3 - (4' - aminophenyl) - 5 - hydroxy - 1,1,3 - trimethyl indane are introduced. A solution of about 363 parts of dimethyl aniline in approximately 400 parts by volume of chlorobenzene is then added dropwise while cooling between about 20 to 25° C. over a period of about 25 minutes. The mixture is then heated to about 127° C. over a period of about 15 minutes, after which time, it is allowed to cool. It is washed at about 0° C. with ice water and then dried over sodium sulphate. The solvent is removed at about 20 mm. Hg and the 3 - (4' - isocyanato-phenyl)-1,1,3 - trimethyl indane - 5 - chloroformic acid ester is distilled over at a temperature between about 160 to 162° C./0.02 mm. Hg in the form of a viscous liquid. Yield: 320 parts (90% of the theoretical).

$C_{20}H_{18}O_3NCl$ (mol wt. 355.7).—Calculated (percent): C, 67.6; H, 5.07; N, 3.94. Found (percent): C, 67.45; H, 5.12; N, 3.99.

EXAMPLE 8

Approximately 210 parts of phosgene are introduced into 1000 parts by volume of chlorobenzene at about 0° C. to form a solution to which a solution of 271 parts of 2,2 - (4 - amino - 4' - hydroxyethoxy-diphenyl)-propane in about 400 parts by volume of chlorobenzene is added dropwise. About 363 parts of dimethyl aniline are then added over a period of about 50 minutes at a temperature of about 20° C. The temperature is then raised to about 80° C. over a period of about 20 minutes. The mixture is cooled to about 0° C. after which the dimethylaniline hydrochloride is removed by washing with ice water, and then dried over sodium sulphate. The isopropylidene - 4 - isocyanatophenyl-phenyl - 4' - ethoxy-chloroformic acid ester distills over at about 172 to about 175° C./0.2 mm. Hg in the form of a yellowish liquid. Yield: 281 parts (78% of the theoretical).

$C_{19}H_{18}O_4NCl$ (mol wt. 359.8).—Calculated (percent): C, 63.45; H, 5.04; N, 3.89. Found (percent): C, 63.65; H, 4.97; N, 3.68.

A solution of 2 parts by weight of this isocyanato chloroformic acid ester and 1 part by weight of trimethylol propane in 5 parts by weight of acetic acid ethylester is prepared. In this solution a sample of iron, steel, copper or zinc are dipped and the coated samples are dried in a stove at 50° C. until a hard and glossy coating is obtained.

The foregoing discussions illustrate specific examples and specific procedures used to prepare an illustrative group of compositions encompassed within the spirit of the invention. It should be understood, however, that anyone skilled in the art upon a reading of this basic invention, will consider other ramifications and deviations relating to these compositions. It is to be understood that these are considered to be within the scope and preview of this invention.

What is claimed is:

1. A compound of the formula

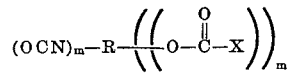

wherein R is a substituted or unsubstituted hydrocarbon radical having from 2 to 18 carbon atoms, said hydrocarbon radical being selected from the group consisting of an alkylene, alkenylene, alkylene arylene, arylene alkylene, cycloalkylene, cycloalkenylene, alkylcycloalkylene, and alkylcycloalkenylene radical and said substituents on said substituted hydrocarbon radical being selected from the group consisting of halo, nitro, alkoxy and carboalkoxy groups, X is a chlorine atom and $m$ is an integer of from 1 to 3.

2. The compound of claim 1 wherein $m$ is an integer of from 1 to 2, the sum of the two $m$'s being an integer of up to 3.

3. The compound of claim 1 wherein R is a divalent diphenylalkane radical.

4. The compound of claim 1 which is isopropylidenephenyl - 4 - isocyanatophenyl - 4' - chloroformic acid ester.

5. The compound of claim 1 which is isopropylidene-3,5 - dimethylphenyl - 4 - isocyanatophenyl - 4' - chloroformic acid ester.

6. The compound of claim 1 which is isopropylidene-5 - methylphenyl - 2 - isocyanatophenyl - 4' - chloroformic acid ester.

7. The compound of claim 1 which is 3-(4'-isocyanatophenyl - 1,1,3 - trimethylindane - 5 - chloroformic acid ester.

References Cited

UNITED STATES PATENTS 3,434,822  3/1969  Wilson et al. _____ 71—106
3,322,812  5/1967  Brotherton et al. ____ 260—463

LEWIS GOTTS, Primary Examiner

D. G. RIVERS, Assistant Examiner

U.S. Cl. X.R.

260—47 CB, 47 XA, 77.5 AP, 77.5 AN, 77.5 D, 858